US012451790B2

(12) United States Patent
Kumar Reddy Surkanti et al.

(10) Patent No.: US 12,451,790 B2
(45) Date of Patent: Oct. 21, 2025

(54) CONTROLLERS FOR PROGRAMMABLE POWER SUPPLIES AND ASSOCIATED SYSTEMS AND METHODS

(71) Applicant: Maxim Integrated Products, Inc., San Jose, CA (US)

(72) Inventors: Punith Kumar Reddy Surkanti, Chandler, AZ (US); Anurag Veerabathini, San Mateo, CA (US); Jan Feliks Swidzinski, Gilbert, AZ (US); Nesaruddin A. Khan, Chandler, AZ (US)

(73) Assignee: Maxim Integrated Products, Inc., San Jose, CA (US)

( * ) Notice: Subject to any disclaimer, the term of this patent is extended or adjusted under 35 U.S.C. 154(b) by 302 days.

(21) Appl. No.: 18/176,645

(22) Filed: Mar. 1, 2023

(65) Prior Publication Data
US 2023/0315136 A1 Oct. 5, 2023

Related U.S. Application Data

(60) Provisional application No. 63/362,324, filed on Mar. 31, 2022.

(51) Int. Cl.
*H02M 1/00* (2007.01)
*G05F 1/575* (2006.01)
*H02M 3/156* (2006.01)

(52) U.S. Cl.
CPC .......... *H02M 1/0025* (2021.05); *G05F 1/575* (2013.01); *H02M 1/0009* (2021.05); *H02M 3/156* (2013.01)

(58) Field of Classification Search
CPC ... H02M 1/0009; H02M 1/0025; H02M 3/156
See application file for complete search history.

(56) References Cited

U.S. PATENT DOCUMENTS

| 4,933,625 A * | 6/1990 | Hayakawa | G05F 1/575 323/280 |
| 6,353,309 B1 * | 3/2002 | Ootani | H03K 17/122 323/282 |
| 6,438,007 B1 * | 8/2002 | Pilukaitis | H02M 7/08 363/50 |

(Continued)

OTHER PUBLICATIONS

Dialog Semiconductor, iW1799 Data Sheet, Dec. 18, 2019, 6 pages.
(Continued)

*Primary Examiner* — Jue Zhang
*Assistant Examiner* — Lakaisha Jackson
(74) *Attorney, Agent, or Firm* — DLA Piper LLP (US)

(57) ABSTRACT

A method for controlling a power supply includes (1) generating a current error signal representing a difference between (a) magnitude of an output current of the power supply and (b) magnitude of a reference current value and (2) providing the current error signal for injection into a voltage feedback node of the power supply. A controller for a power supply includes (1) a current control subsystem configured to regulate a magnitude of an output current of the power supply and (2) a voltage control subsystem configured to regulate a magnitude of an output voltage of the power supply, the voltage control subsystem being logically coupled in series with the current control subsystem.

16 Claims, 10 Drawing Sheets

(56) References Cited

U.S. PATENT DOCUMENTS

| | | | | |
|---|---|---|---|---|
| 2004/0242120 | A1* | 12/2004 | Warren | A41C 3/10 |
| | | | | 450/57 |
| 2004/0242170 | A1* | 12/2004 | Gilbert | H03G 3/3047 |
| | | | | 455/127.1 |
| 2007/0069039 | A1* | 3/2007 | DeCosmo | G08B 17/06 |
| | | | | 236/100 |
| 2011/0006937 | A1* | 1/2011 | Zoso | H03M 3/422 |
| | | | | 341/143 |
| 2020/0110430 | A1* | 4/2020 | Chuang | G05F 1/575 |
| 2022/0103076 | A1* | 3/2022 | Cheng | H02M 3/33523 |
| 2024/0405657 | A1* | 12/2024 | Krabbenborg | H02M 1/4225 |

OTHER PUBLICATIONS

MPS MPQ4210 Data Sheet, Aug. 30, 2017, 1 page.
MPS MPQ4230 Data Sheet, Mar. 19, 2018, 27 pages.
Power Integrations Design Example Report, 100W USB PD 3.0 Power Supply With 3.3V-21V PPS Output Using InnoSwitch (TM) 3-Pro GaN-based INN3370C-H302 and VIA Labs VP302, Nov. 25, 2019, 121 pages.
Qorvo ACT4751M Data Sheet, Jan. 28, 2020, 70 pages.
Richtek AN056 Application Note, Roland van Roy, Sep. 2017, 25 pages.

* cited by examiner

CONTROLLERS FOR PROGRAMMABLE POWER SUPPLIES AND ASSOCIATED SYSTEMS AND METHODS

RELATED APPLICATIONS

This application claims benefit of priority to U.S. Provisional Patent Application Ser. No. 63/362,324, filed on Mar. 31, 2022, which is incorporated herein by reference.

BACKGROUND

There are significant advantages to being able to tightly control a power supply output voltage and/or output current. For example, consider a scenario where (1) a linear regulator is used to control charging of a battery (2) and a power supply is used to provide bulk electrical power to the linear regulator. Power dissipation in the linear regulator is proportional to a difference between (1) an input voltage to the linear regulator, i.e., output voltage of the power supply, and (2) output voltage of the linear regulator, i.e., voltage for charging the battery. As such, it is desirable to tightly control output voltage of the power supply so that it is as close as possible to the linear regulator output voltage, while accounting from dropout voltage of the linear regulator, to minimize power dissipation in the linear regulator.

As another example, consider a scenario where a power supply is configured to charge a battery directly or indirectly. It is often desirable to charge a battery at a constant current magnitude, such as when the battery is at a relatively low state of charge. Therefore, it is desirable to tightly control the output current magnitude of the power supply to achieve a desired charging current for the battery.

DETAILED DESCRIPTION OF THE EMBODIMENTS

Conventional power supplies configured to control output voltage magnitude and output current magnitude include a voltage control subsystem and a current control subsystem logically coupled in parallel. The voltage control subsystem is configured to control output voltage magnitude, and the current control system is configured to control output current magnitude. Conventional power supplies including these two control subsystems are configured to switch between the voltage control subsystem and the current control subsystem according to power supply operating mode. For example, a power supply may switch from the voltage control subsystem to the current control subsystem in response to the power supply transitioning from a constant voltage operating mode to a constant current operating mode, and the power supply may switch from the current control subsystem to the voltage control subsystem in response to the power supply transitioning from the constant current operating mode to the constant voltage operating mode. However, it is frequently difficult to maintain tightly regulated output voltage magnitude and tightly regulated output current magnitude while switching between the two parallel control subsystems.

Disclosed herein are controllers for programmable power supplies (PPSs) and associated systems and methods which significantly advance the state of the art. The new controllers at least partially implement two control subsystems, i.e., a voltage control subsystem and a current control subsystem, that are logically connected in series, instead of being logically connected in parallel. Certain embodiments are advantageously capable of achieving tight regulation and high granularity of both output voltage magnitude and output current magnitude, even during transitions between constant current and constant voltage operating modes. For example, some embodiments have a programmable output voltage range of 3.3 volts to 21 volts with 10 millivolt programmable steps. Additionally, some embodiments have a programmable output current range of 1 ampere to 5 amperes with 25 milliamperes programmable steps. Furthermore, particular embodiments may be used with essentially any power stage that is capable of being controlled from a voltage error signal, i.e., a signal that is a function of a difference between an actual power supply output voltage magnitude and a reference voltage magnitude.

Figure 1:
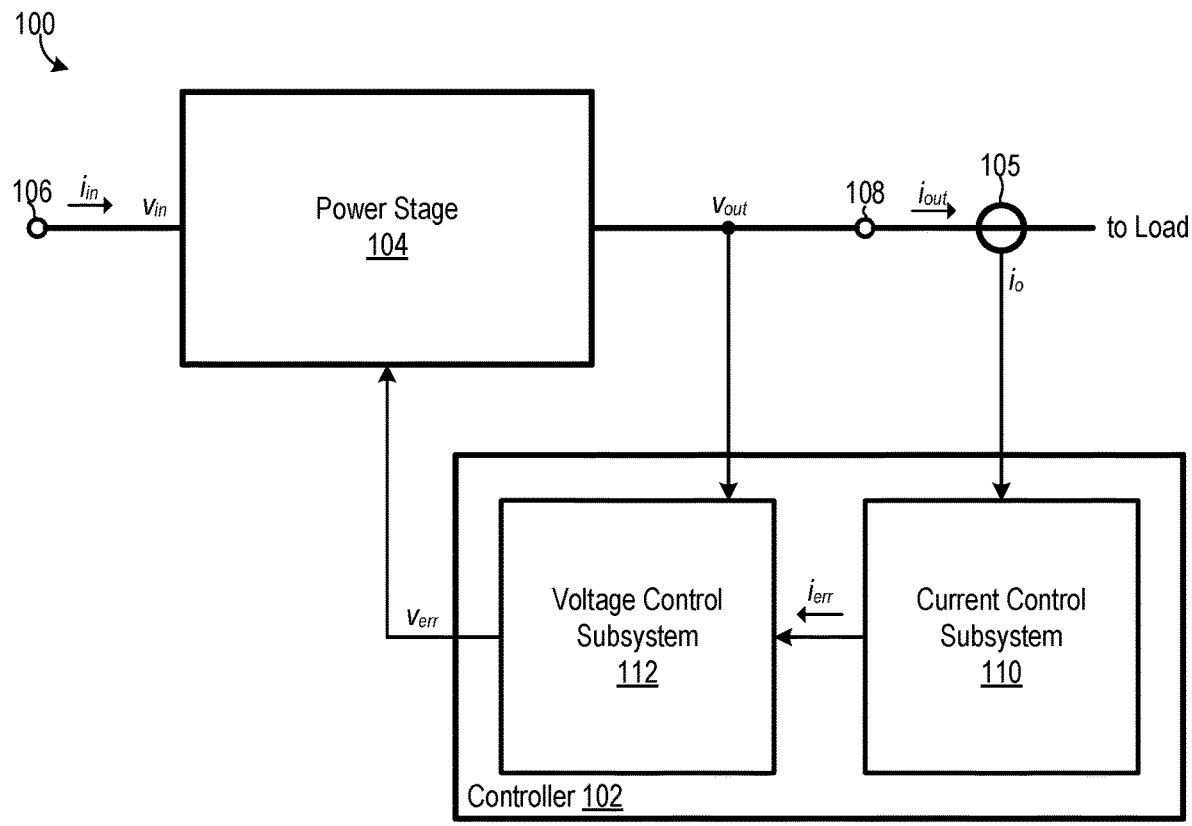
FIG. 1 is a block diagram of a programmable power supply, according to an embodiment.

FIG. 1 is a block diagram of a programmable power supply 100 including a controller 102, a power stage 104, and a current sense device 105, where controller 102 is an embodiment of the new controllers disclosed herein. Power stage 104 is electrically coupled between an input power node 106 and an output power node 108, and power stage 104 is configured to operate at least partially according to a voltage error signal $v_{err}$ generated by controller 102. In particular, power stage 104 is configured to (a) convert an input voltage $v_{in}$ on input power node 106 to an output voltage $v_{out}$ on output power node 108 in response to voltage error signal $v_{err}$, and/or (b) convert an input current $i_{in}$ flowing into power stage 104 from input power node 106 to an output current $i_{out}$ flowing out of power stage 104 to output power node 108 in response to voltage error signal $v_{err}$. Polarity of voltages $v_{in}$ and $v_{out}$ and currents $i_{in}$ and $i_{out}$ may be positive or negative depending on the configuration of power stage 104 and the operating conditions of power supply 100. Additionally, two or more of voltage $v_{in}$, voltage $v_{out}$, current $i_{in}$, and current $i_{out}$ may have different respective polarities. Voltage error signal $v_{err}$ may be either an analog signal or a digital signal depending on the configuration of controller 102.

While not required, a load (not shown) is typically electrically coupled to output power node 108, such that programmable power supply 100 provides electrical power to the load. The load need not be part of programmable power supply 100.

Power stage 104 can have essentially topology as long as it is capable of performing aforementioned voltage magnitude conversion from $v_{in}$ to $v_{out}$ and/or aforementioned current magnitude conversion from $i_{in}$ to $i_{out}$ at least partially under the command of voltage error signal $v_{err}$. For example, in some embodiments, power stage 104 includes a linear regulator where a pass element, such as a transistor, is modulated according to a value of voltage error signal $v_{err}$. As another example, in certain embodiments, power stage 104 includes a switching converter configured to vary duty cycle and/or switching frequency according to the value of voltage error signal $v_{err}$. Examples of possible switching converters that may be included in power stage 104 include, but are not limited to, one or more of a buck converter, a boost converter, a buck-boost converter, a cúk converter, a flyback converter, a forward converter, a half-bridge converter, a full-bridge converter, a resonant converter, and a switched capacitor converter.

Figure 2:
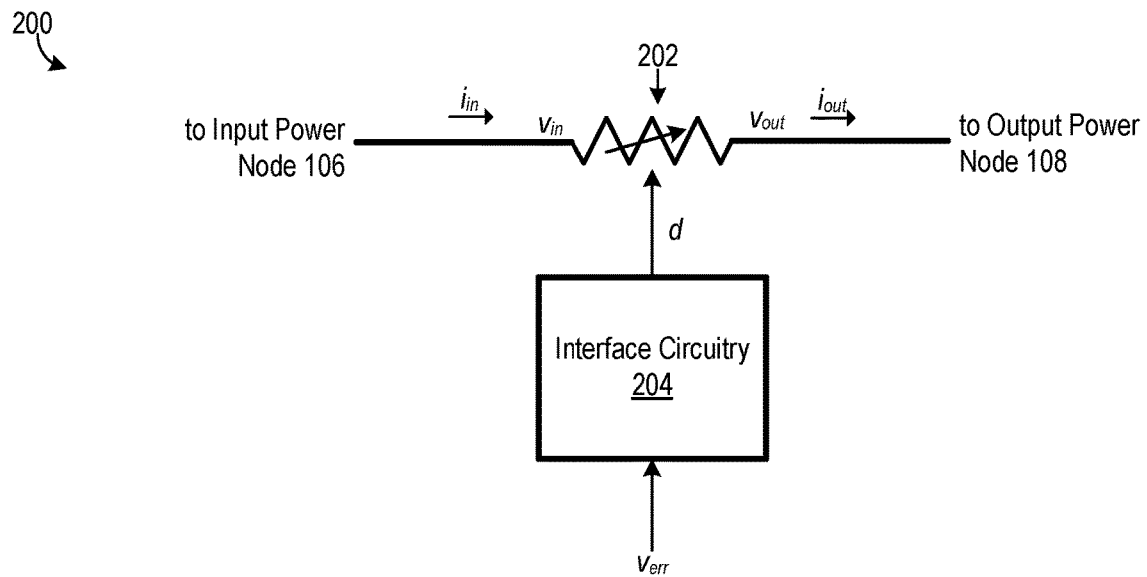
FIG. 2 is a schematic diagram of one possible embodiment of a power stage of the FIG. 1 programmable power supply.
Figure 3:
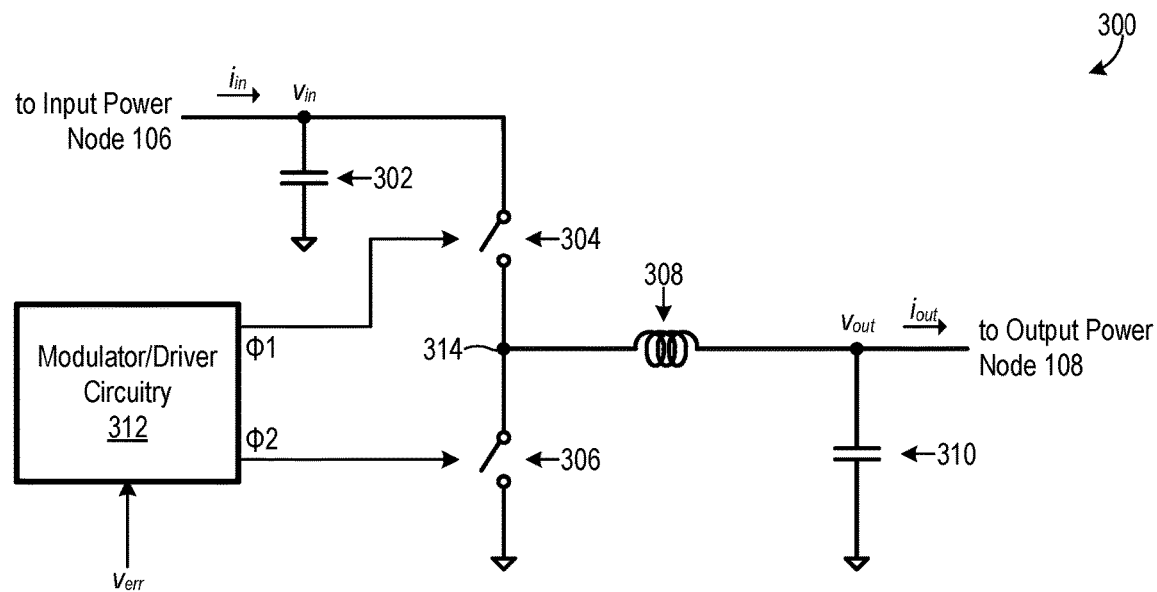
FIG. 3 is a schematic diagram of another possible embodiment of the power stage of the FIG. 1 programmable power supply.

FIGS. 2 and 3, discussed below, illustrate two possible embodiments of power stage 104. It is understood, however, that power stage 104 is not limited to these two example embodiments.

FIG. 2 is a schematic diagram of a power stage 200, which is one possible embodiment of power stage 104 of FIG. 1. Power stage 200 is a linear regulator and includes a pass element 202 and interface circuitry 204. Pass element 202 is electrically coupled between input power node 106 and output power node 108, and pass element 202 is configured to exhibit an effective resistance that is a function of a drive signal d from interface circuitry 204. In some embodiments, pass element 202 includes one or more transistors, such as field effect transistors (FETs) and/or bipolar junction transistors (BJTs), configured to operate in their linear regions according to drive signal d.

Interface circuitry 204 is configured to interface pass element 202 with controller 102 by converting voltage error signal $v_{err}$ to a form suitable for controlling pass element 202. For example, in an embodiment where pass element 202 includes one or more FETs, interface circuitry 204 may be configured to shift voltage of voltage error signal $v_{err}$ to a level that is suitable for driving respective gates of the one or more FETs. As another example, in an embodiment where pass element 202 includes one or more BJTs, pass element 202 may be configured to convert voltage error signal $v_{err}$ to a drive current of sufficient magnitude to drive respective bases of the one or more BJTs. Additionally, some embodiments of interface circuitry 204 are configured to perform polarity reversal, such as in embodiments where polarity of voltage error signal $v_{err}$ is opposite of a polarity required to drive pass element 202. Furthermore, in embodiments where voltage error signal $v_{err}$ is a digital signal, interface circuitry 204 may be configured to perform digital to analog conversion.

FIG. 3 is a schematic diagram of a power stage 300, which is another possible embodiment of power stage 104 of FIG. 1. Power stage 300 is a buck converter, and power stage 300 includes an input capacitor 302, a control switching device 304, a freewheeling switching device 306, an inductor 308, an output capacitor 310, and modulator/driver circuitry 312. Input capacitor 302 is electrically coupled between input power node 106 and ground, and input capacitor 302 provides a path for input ripple current to power stage 300. Input capacitor 302 is omitted in some alternate embodiments of power stage 300, such as in embodiments where input power node 106 has significant other capacitance (not shown).

Control switching device 304 is electrically coupled between input power node 106 and a switching node 314, and freewheeling switching device 306 is electrically coupled between switching node 314 and ground. Each switching device 304 and 306 includes, for example, one or more transistors. Control switching device 304 and freewheeling switching device 306 are repeatedly driven between their open and closed states (non-conductive and conductive states) in response to control signals φ1 and φ2, respectively. In some alternate embodiments, freewheeling switching device 306 is replaced with a diode having an anode electrically coupled to ground and a cathode electrically coupled to switching node 314.

Inductor 308 is electrically coupled between switching node 314 and output power node 108, and output capacitor 310 is electrically coupled between output power node 108 and ground. Output capacitor 310 provides a path for output ripple current of power stage 300, and output capacitor 310 may also help support transient loads on power stage 300. Additionally, in some embodiments, capacitance and/or equivalent series resistance (ESR) of output capacitor 310 helps achieve desired control loop characteristics of programmable power supply 100, such as a desired phase margin and/or a desired gain margin. Output capacitor 310 is omitted in some alternate embodiments of power stage 300, such as in embodiments where output power node 108 has significant other capacitance (not shown).

Modulator/driver circuitry 312 generates control signal φ1 to cause power stage 300 to regulate one or more of output voltage $v_{out}$ and output current $i_{out}$ in response to voltage error signal $v_{err}$. For example, in embodiments of modulator/driver circuitry 312 implementing pulse width modulation (PWM) control, modulator/driver circuitry 312 controls duty cycle of control signal φ1 based on voltage error signal $v_{err}$. As another example, in embodiments of modulator/driver circuitry 312 implementing pulse frequency modulation (PFM) control, modulator/driver circuitry 312 controls frequency of control signal φ1 based on voltage error signal $v_{err}$. Additionally, modulator/driver circuitry 312 generates control signal φ2 such that freewheeling switching device 306 provides a path for current flowing through inductor 308 when control switching device 304 is in its open state. Control signal φ2 is omitted in alternate embodiments of power stage 300 where freewheeling switching device 306 is replaced with a diode.

Referring again to FIG. 1, current sense device 105 is configured to generate a current sense signal $i_o$ representing magnitude of output current $i_{out}$. In some embodiments, current sense device 105 includes one or more of a current sense resistor, a Hall effect resistor, and a replica transistor matched with a power transistor within power stage 104.

Although current sense device 105 is illustrated as being a stand-alone element, current sense device 105 could be at least partially integrated in controller 102 and/or power stage 104 without departing from the scope hereof. Current sense signal $i_o$ could be either a voltage signal representing magnitude of output current $i_{out}$ or a current signal representing magnitude of output current $i_{out}$, and current sense signal $i_o$ could be either in analog form or digital form, depending on the implementation of current sense device 105.

Figure 4:
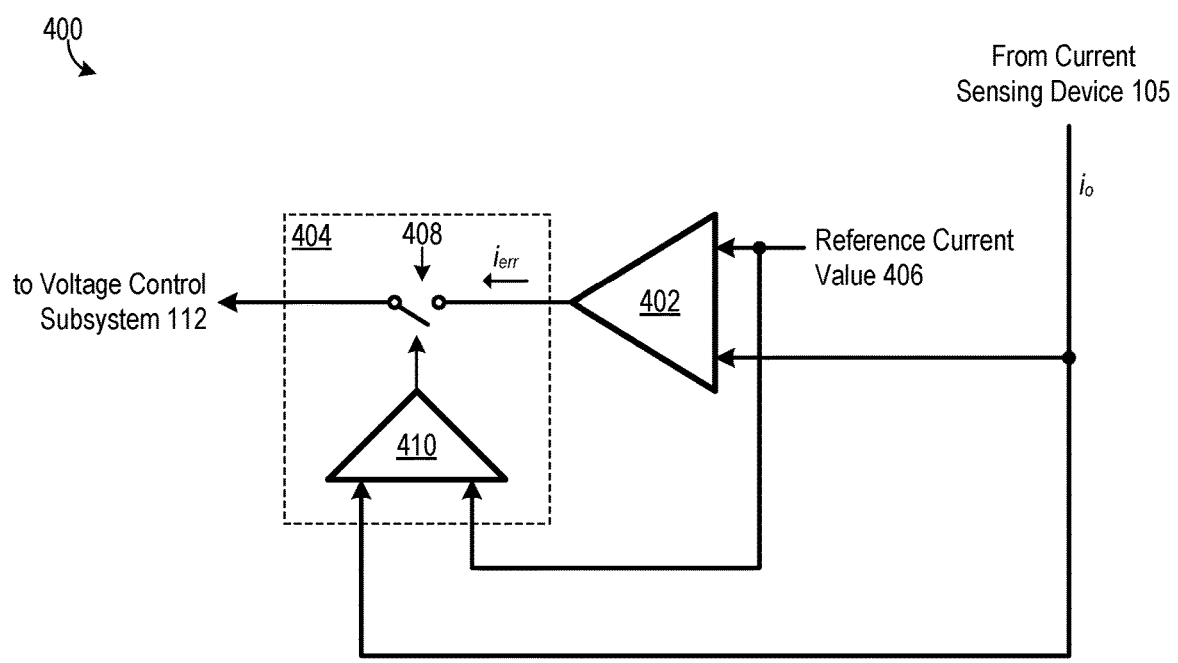
FIG. 4 is a schematic diagram of an embodiment of a current control subsystem of the FIG. 1 programmable power supply.

Controller 102 includes a current control subsystem 110 and a voltage control subsystem 112. Current control subsystem 110 is configured to generate a current error signal $i_{err}$ at least partially based on a difference between (a) magnitude of output current $i_{out}$, as indicated by current sensing signal $i_o$, and (b) a reference current value, to regulate magnitude of output current $i_{out}$, such as to a programmed, or desired, value of output current $i_{out}$ magnitude. For example, FIG. 4 is a schematic diagram of a current control subsystem 400, which is one possible embodiment of current control subsystem 110 of FIG. 1. Current control subsystem 400 includes current error circuitry 402 and switching circuitry 404. Current error circuitry 402 is configured to generate current error signal $i_{err}$ at least partially based on a difference between (a) magnitude of output current $i_{out}$, as represented by current sensing signal $i_o$, and (b) magnitude of a predetermined reference current value 406. Reference current value 406 represents a programmed, or desired, magnitude of output current $i_{out}$. Some embodiments of current error circuitry 402 are configured such that current error signal $i_{err}$ is a linear function of a difference between current sensing signal $i_o$ and reference current value 406, while in some other embodiments, current error circuitry 402 is configured such that current error signal $i_{err}$ is a non-linear function of a difference between current sensing signal $i_o$ and reference current value 406.

As discussed below, current error signal $i_{err}$ is injected into a voltage feedback node of voltage control subsystem 112, such that voltage error signal $v_{err}$ is a function of current error signal $i_{err}$ as well as output voltage $v_{out}$, in a constant current operating mode of programmable power supply 100. However, it may be desirable for programmable power supply 100 to operate in a constant voltage mode under some conditions. For example, some embodiments of programmable power supply 100 are configured for use as in a Universal Serial Bus (USB) power system, and in these embodiments, it may be desirable for programmable power supply 100 to operate in a constant voltage mode, such as when charging a battery that is approaching its fully charged state. Accordingly, switching circuitry 404 is configured to enable and disable flow of current error signal $i_{err}$ to voltage control subsystem 112 at least partially based on a relationship between (a) the magnitude of output current $i_{out}$ and (b) magnitude of reference current value 406. Programmable power supply 100 operates in a constant current mode when flow of current error signal $i_{err}$ to voltage control subsystem 112 is enabled, and programmable power supply 100 operates in a constant voltage mode when flow of current error signal $i_{err}$ to voltage control subsystem 112 is disabled.

In particular, switching circuitry 404 includes a switching device 408 and comparison circuitry 410. Switching device 408 is electrically coupled between current error circuitry 402 and voltage control subsystem 112. Consequently, flow of current error signal $i_{err}$ to voltage control subsystem 112 is enabled when switching device 408 is closed, and flow of current error signal $i_{err}$ to voltage control subsystem 112 is disabled when switching device 408 is open. As such, programmable power supply 100 operates in a constant current operating mode when switching device 408 is closed, and programmable power supply 100 operates in a constant voltage operating mode when switching device 408 is open. Switching device 408 switches between its open and closed states under the control of comparison circuitry 410, which is configured to (a) compare magnitude of output current $i_{out}$ and magnitude of reference current value 406, (b) cause switching device 408 to open in response to magnitude of output current $i_{out}$ exceeding magnitude of reference current value 406, and (c) cause switching device 408 to close in response to magnitude of output current $i_{out}$ not exceeding magnitude of reference current value 406.

Some embodiments of comparison circuitry 410 exhibit hysteresis to help prevent undesired oscillation of switching device 408 between its closed and open states. Additionally, some embodiments of comparison circuitry 410 include timing circuitry (not shown) configured to delay change in state of switching device 408 in response to change in relationship between magnitude of output current $i_{out}$ and magnitude of reference current value 406. For example, in some applications of programmable power supply 100, it is desirable to quickly change from a constant voltage operating mode to a constant current operating mode, and it desirable to delay transition from the constant current operating mode to the constant voltage operating mode to prevent a glitch on output power node 108. Accordingly, some embodiments of comparison circuitry 410 are configured to (a) cause switching device 408 to quickly close in response to magnitude of output current $i_{out}$ falling to magnitude of reference current value 406, and (b) cause switching device 408 to open in response to expiration of a delay time period being triggered by magnitude of output current $i_{out}$ exceeding magnitude of reference current value 406. The delay time period, which is adjustable or programmable in some embodiments, delays transition of programmable power supply 100 from its constant current operating mode to its constant voltage operating mode.

Figure 5:
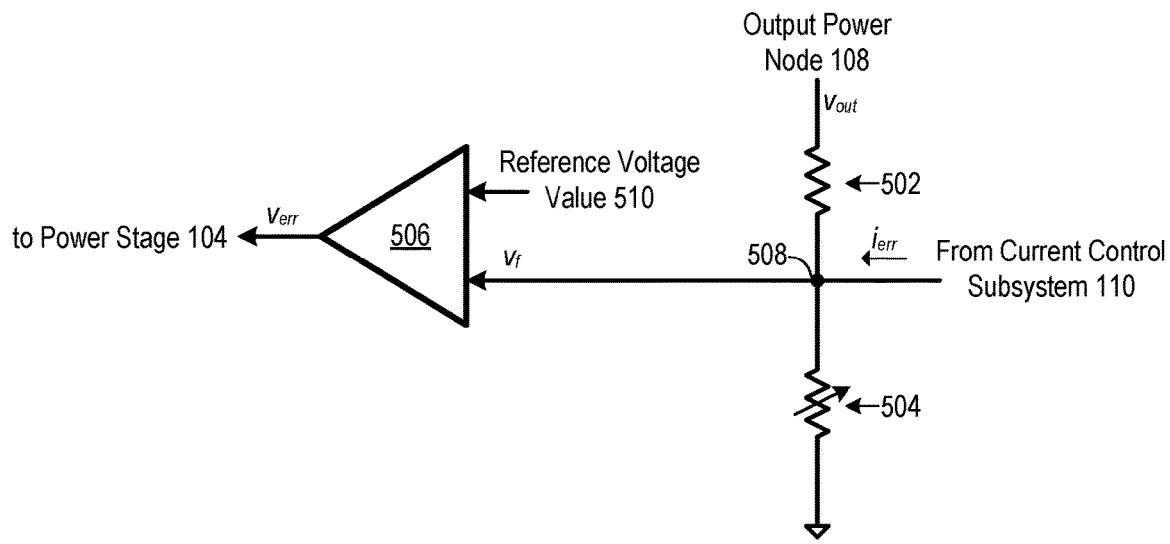
FIG. 5 is a schematic diagram of an embodiment of a voltage control subsystem of the FIG. 1 programmable power supply.

Referring again to FIG. 1, voltage control subsystem 112 is configured to control power stage 104 via voltage error signal $v_{err}$ to regulate magnitude of output voltage $v_{out}$. In particular, voltage control subsystem 112 is configured to generate voltage error signal $v_{err}$ such that the signal represents a difference between (a) a voltage at a voltage feedback node, such as at a resistor divider node, and (b) a reference voltage value. For example, FIG. 5 is a schematic diagram of a voltage control subsystem 500, which is one possible embodiment of voltage control subsystem 112 of FIG. 1. Voltage control subsystem 500 includes a resistive device 502, a resistive device 504, and voltage error circuitry 506. Resistive device 502 is electrically coupled between output power node 108 and a voltage feedback node 508, and resistive device 504 is electrically coupled between voltage feedback node 508 and ground (or a reference node other than ground). As such, resistors 502 and 504 collectively form a voltage divider, and voltage feedback node 508 is a resistor divider node. Current error signal $i_{err}$ from current control subsystem 110 is also injected into voltage feedback node 508.

Resistive device 502 includes, for example, one or more resistors and/or circuitry emulating a resistor. Similarly, resistive device 504 includes, for example, one or more resistors and/or circuitry emulating a resistor. Magnitude of programmable power supply output voltage $v_{out}$ is a function of resistance of a resistance device 502 and resistance of resistance device 504. As such, magnitude of output voltage vow can be varied by varying resistance of resistance device 502 and/or resistance of resistance device 504. Voltage control subsystem 500 is configured such that (a) resistive device 502 has a fixed resistance and (b) resistive device 504 has a variable resistance that is programmable, such that magnitude of output voltage $v_{out}$ can be set by programming resistance of resistive device 504. In some alternate embodiments, however, resistive device 502 has programmable resistance while resistive device 504 has a fixed resistance, or both resistive devices 502 and 504 have respective programmable resistances, such that magnitude of output voltage $v_{out}$ can be set by programming resistance of resistive device 502 in place of, or in addition to, programming resistance of resistive device 504.

Voltage feedback node 508 has a voltage $v_f$. Voltage error circuitry 506 has a high input impedance such that voltage error circuitry 506 does not materially load voltage feedback node 508. Current control subsystem 110 disables flow of current error signal $i_{err}$ into voltage feedback node 508 when programmable power supply 100 operates in its constant voltage mode. Accordingly, magnitude of voltage $v_f$ is essentially equal to magnitude of output voltage $v_{out}$ as divided down by the voltage divider formed by resistive devices 502 and 504, during constant voltage mode operating of programmable power supply 100. On the other hand, current control subsystem 110 enables injection of current error signal $i_{err}$ into voltage feedback node 508 when programmable power supply 100 operates in its constant current mode, and magnitude of voltage $v_f$ is therefore a function of both output voltage $v_{out}$ magnitude and output current $i_{out}$ magnitude during constant current mode operation of programmable power supply 100. Such injection of current error signal $i_{err}$ into voltage feedback node 508 causes programmable power supply 100 to adjust magnitude of output voltage $v_{out}$ to regulate magnitude of output current $i_{out}$, which may non-linearly improve regulation of output voltage $v_{out}$ during transient loading of programmable power supply 100, relative to a programmable power supply without injection of a current error signal into a voltage feedback node.

Voltage control subsystem 500 is configured to generate voltage error signal $v_{err}$ representing a difference between voltage $v_f$ at a voltage feedback node 508 and a reference voltage value 510. Reference voltage value 510 could be either fixed or dynamic. Some embodiments of voltage error circuitry 502 are configured such that voltage error signal $v_{err}$ is a linear function of a difference between voltage $v_f$ and reference voltage value 510, while in some other embodiments, voltage error circuitry 506 is configured such that voltage error signal $v_{err}$ is a non-linear function of a difference between voltage $v_f$ and reference current value 506.

Figure 6:
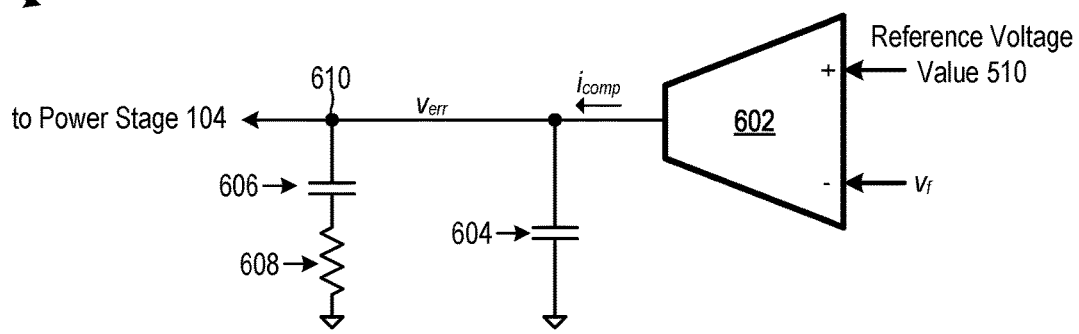
FIG. 6 is a schematic diagram of an embodiment of voltage error circuitry of the FIG. 5 voltage control subsystem.

FIG. 6 is a schematic diagram of voltage error circuitry 600, which is one possible embodiment of voltage error circuitry 506 of FIG. 5. Voltage error circuitry 600 includes a transconductance amplifier 602, a capacitor 604, a capacitor 606, and a resistor 608. Transconductance amplifier 602 includes an output electrically coupled to a compensation node 610. Capacitor 604 is electrically coupled between compensation node 610 and ground or another reference node, and capacitor 604 and resistor 608 are electrically coupled in series between compensation node 610 and ground or another reference node. Transconductance amplifier 602 is configured to generate a current $i_{comp}$ flowing into compensation node 610, and where $i_{comp}$ is proportional to a difference between $v_f$ at a voltage feedback node 508 and reference voltage value 510. Capacitor 604, capacitor 606, and resistor 608 collectively form a Type-II compensation network which generates voltage error signal $v_{err}$ from compensation current $i_{comp}$.

The configuration of voltage error circuitry 600 could vary without departing from the scope hereof. For example, transconductance amplifier 602 could be replaced with a voltage amplifier, with appropriate changes to the compensation network, without impairing functionality of voltage error circuitry 600.

Figure 7:
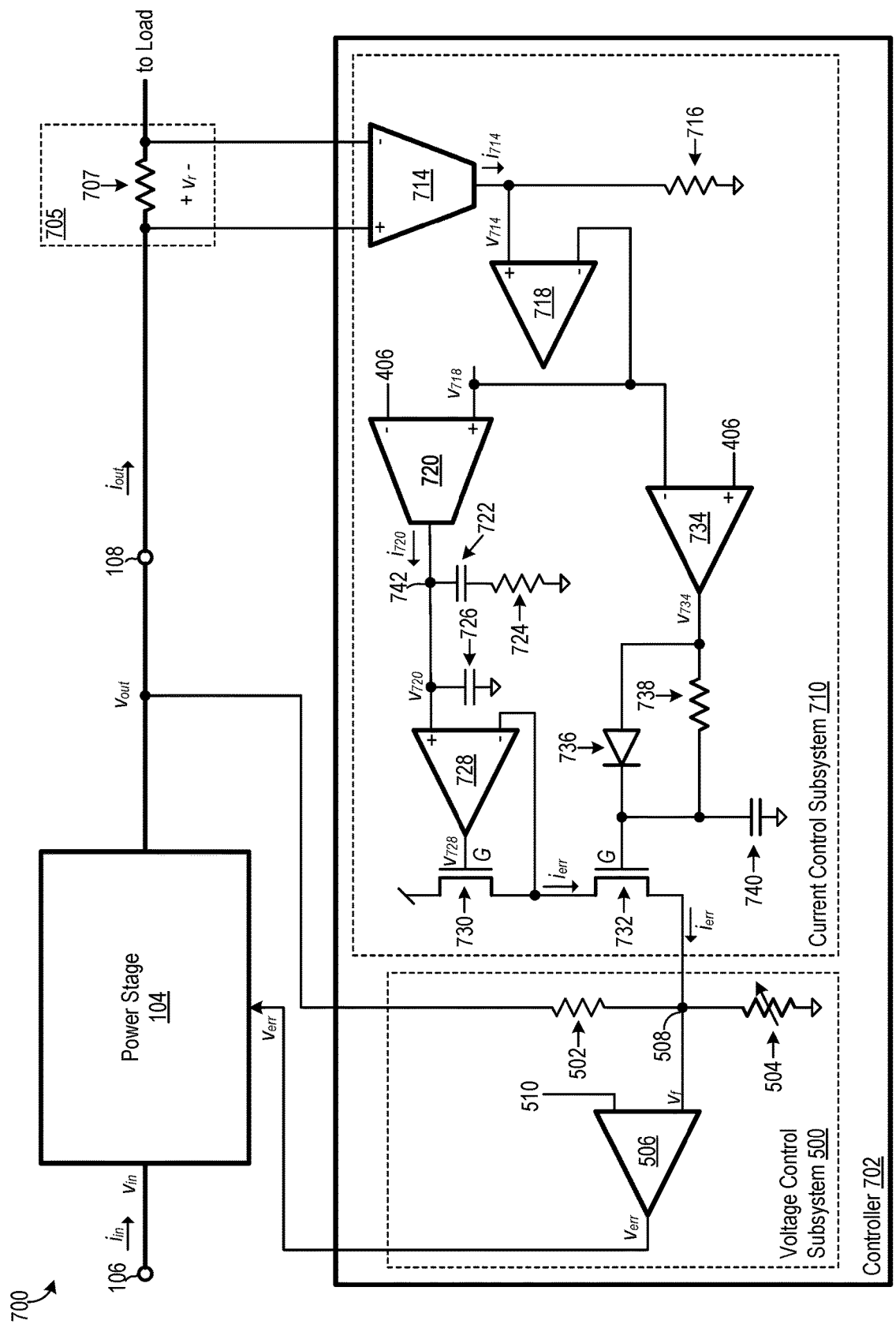
FIG. 7 is a block diagram of an embodiment of the FIG. 1 programmable power supply including an embodiment of the FIG. 4 current control subsystem and an instance of the FIG. 5 voltage control system.

FIG. 7 is a block diagram of a programmable power supply 700, which is an embodiment of programmable power supply of FIG. 1 where (a) current sense device 105 is embodied by a current sense device 705 and (b) controller 102 is embodied by a controller 702. Current sense device 705 includes a current sense resistor 707 electrically coupled between output power node 108 and a load (not shown) powered by programmable power supply 700, such that output current $i_{out}$ flows through current sense resistor 707. While not required, current sense resistor 707 typically has a small resistance value to prevent significant voltage drop across the resistor, as well as to prevent excessive power dissipation in resistor. Current sense device 705 generates a voltage $v_r$ proportional to magnitude of output current $i_{out}$, where voltage $v_r$ is an embodiment of current sense signal $i_o$ of FIG. 1.

Control subsystem 702 includes a current control subsystem 710 and an instance of voltage control subsystem 500 of FIG. 5. Current control subsystem 710 is an embodiment of current control subsystem 400 of FIG. 4, and current control subsystem 710 includes the following elements: a transconductance amplifier 714, a resistor 716, an amplifier 718, a transconductance amplifier 720, a capacitor 722, a resistor 724, a capacitor 726, an amplifier 728, a FET 730, a FET 732, an amplifier 734, a diode 736, a resistor 738, and a capacitor 740. Transconductance amplifier 714, resistor 716, amplifier 718, transconductance amplifier 720, capacitor 722, resistor 724, capacitor 726, amplifier 728, and FET 730 collectively form an embodiment of current error circuitry 402 of FIG. 4, and amplifier 734, diode 736, resistor 738, and capacitor 740 collectively form an embodiment of comparison circuitry 410 of FIG. 4. FET 732 is an embodiment of switching device 408 of FIG. 4.

Transconductance amplifier 714 is configured to generate a current $i_{714}$ in response to voltage $v_r$ from current sense device 705, and resistor 716 is configured to convert current $i_{714}$ to a voltage $v_{714}$. Amplifier 718 is configured as a voltage follower, and amplifier 718 is configured to generate a voltage $v_{718}$ having the same magnitude as voltage $v_{714}$. Magnitude of voltage $v_{718}$ is proportional to magnitude of output current $i_{out}$. Transconductance amplifier 720 is configured to generate a current $i_{720}$ flowing into a compensation node 742, and magnitude of current $i_{720}$ is proportional to a difference between voltage $v_{718}$ and reference current value 406. An output of transconductance amplifier 720 is electrically coupled to a non-inverting input of amplifier 728 via compensation node 742, and capacitor 726 is electrically coupled between compensation node 742 and ground or another reference node. Capacitor 722 and resistor 724 are electrically coupled in series between compensation node 742 and ground or another reference node. Capacitor 726, capacitor 722, and resistor 724 collectively form a Type-II compensation network which generates a voltage $v_{720}$ from current $i_{720}$.

Amplifier 728 and FET 730 are collectively configured to operate as a current source controlled by magnitude of voltage $v_{720}$. Specifically, amplifier 728 is configured to drive a gate G of FET 730 via a voltage $v_{728}$ to generate current error signal $i_{err}$ flowing to FET 732, in response to voltage $v_{720}$. FET 732 is configured to enable and disable flow of current error signal $i_{err}$ in response to a voltage $v_{734}$ generated by amplifier 734. Amplifier 734 is configured to generate voltage $v_{734}$ at its output such that voltage $v_{734}$ is proportional to a difference between reference current value 406 and voltage $v_{718}$, where magnitude of voltage $v_{718}$ is proportional to magnitude of output current $i_{out}$, as discussed above. Diode 736 is electrically coupled between the output of amplifier 734 and a gate G of FET 732, and capacitor 740 is electrically coupled between gate G of FET 732 and ground or another reference node. Resistor 738 is electrically coupled in parallel with diode 736.

Diode 736 provides a low-impedance forward conduction path between the output of amplifier 734 and gate G of FET 732, such that current control subsystem 710 is configured to quickly charge capacitor 740 and internal gate capacitance of FET 732. Consequently, current control subsystem 710 is configured to quickly cause FET 732 to switch from its off (non-conductive) state to its on (conductive) state, thereby quickly enabling flow of current error signal $i_{err}$ to voltage control subsystem 500 in response to programmable power supply 700 transitioning from a constant voltage operating mode to a constant current operating mode. However, diode 736 does not provide a path for discharging capacitor 740 and internal gate capacitance of FET 732. Consequently, this capacitance must be discharged through resistor 738, which slows switching of FET 732 from its on state to its off state. Therefore, current control subsystem 710 is configured to delay programmable power supply in transitioning from its constant current operating mode to its constant voltage operating mode for a delay time period that is a function of a resistive-capacitance (RC) time constant T defined by (a) resistance of resistor 738 and (b) capacitance of capacitor 740.

In some embodiments, resistance of resistor 738 and/or capacitance of capacitor 740 is programmable, such that RC time constant T is adjustable or programmable. In some alternate embodiments, resistor 738 and capacitor 740 are replaced with alternative timing circuitry to delay transition of programmable power supply 700 from its constant current operating mode to its constant voltage operating mode. Additionally, in particular alternate embodiments, some or all of the elements of current control subsystem 710 are implemented with digital circuitry. For example, the RC time constant T established by resistor 738 and capacitor 740 could be replaced with a digital timer. As another example, some or all of the elements of current control subsystem 710 could be replaced by a processor configured to execute instructions, such as in the form of software and/or firmware, stored in a data store, to perform some or all of the functions of current control subsystem 710.

Referring again to FIG. 5, magnitude of output voltage $v_{out}$ can be set by programming resistance of resistive device 504, as discussed above. In some embodiments, resistive device 504 includes a Sigma-Delta digital to analog converter (DAC), where an equivalent resistance of the Sigma-Delta DAC is programmed by a digital input signal to the Sigma-Delta DAC. Applicant has found that implementing resistive device 504 at least partially via a Sigma-Delta DAC can advantageously achieve high resolution of output voltage $v_{out}$ magnitude. For example, in some embodiments of programmable power supply 100 where resistive device 504 is implemented at least partially via a Sigma-Delta DAC, magnitude of output voltage $v_{out}$ can be programmed with a resolution of 20 mV or even 10 mV. In some other embodiments of programmable power supply 100, resistive device 502 is implemented by a Sigma-Delta DAC, or both of resistive devices 502 and 504 are implemented by respective Sigma-Delta DACs.

Figure 8:
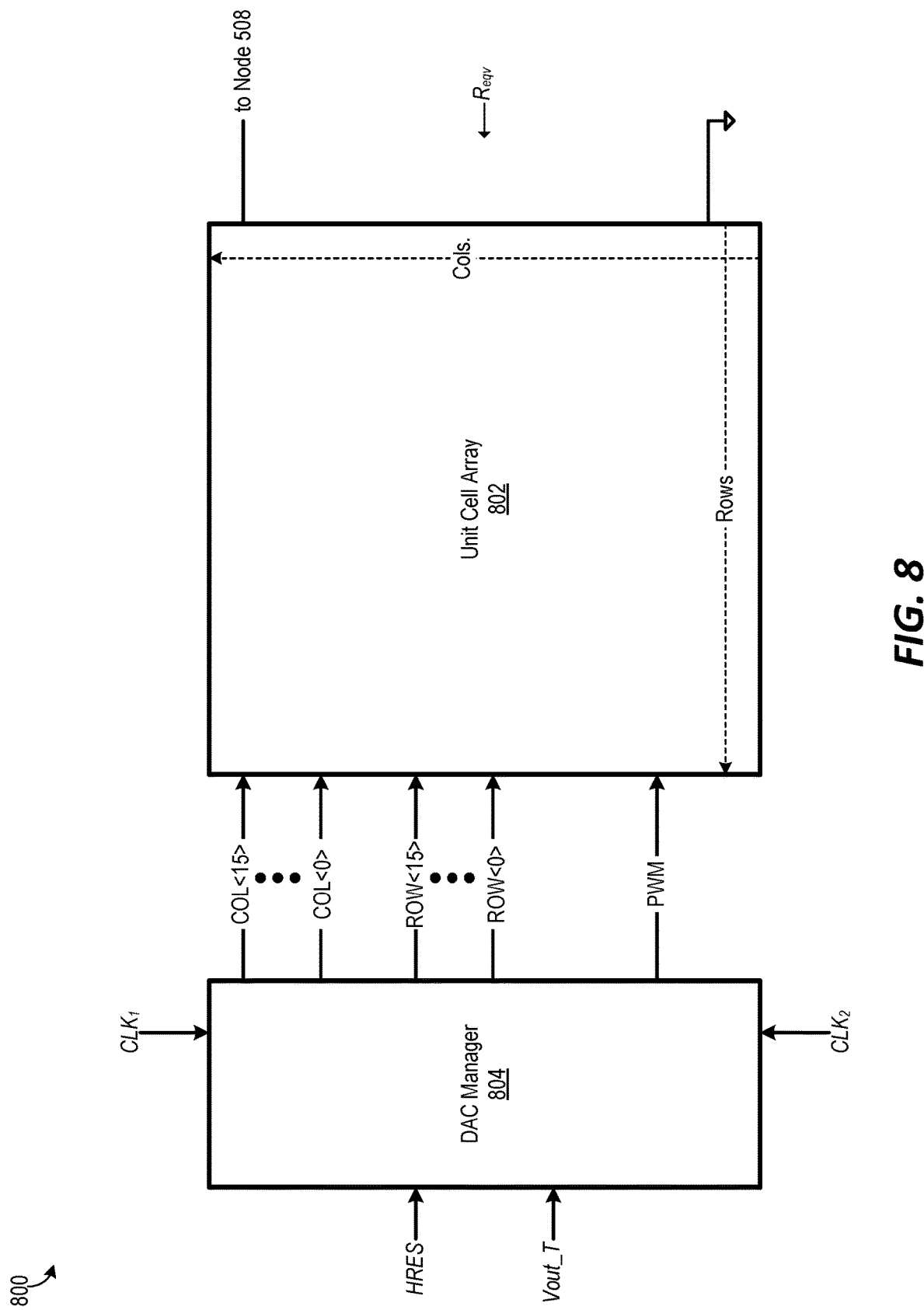
FIG. 8 is a block diagram of a Sigma-Delta digital to analog converter (DAC), according to an embodiment.

FIG. 8 is a block diagram of a Sigma-Delta DAC 800, henceforth referred to as "DAC 800" for brevity, which is one possible embodiment of resistive device 504 when resistive device 504 is implemented by a Sigma-Delta DAC. DAC 800 includes a unit cell array 802 and a DAC manager 804. Unit cell array 802 includes a plurality of rows and columns of unit cells (not shown in FIG. 8) which are controlled by DAC manager 804 to achieve an equivalent resistance $R_{eqv}$ of unit cell array 802, as seen when looking into unit cell array 802 from voltage feedback node 508 with respect to ground. Accordingly, magnitude of output voltage $v_{out}$ is a function of equivalent resistance $R_{eqv}$ of unit cell array 802. Unit cell array 802 includes 16 columns and 16 rows of unit cells, i.e., columns 0-15 and rows 0-15 of unit cells, in the FIG. 8 embodiment. However, unit cell array 802 could be modified to have a different number of rows and columns of unit cells. Resolution of output voltage $v_{out}$ magnitude programmability generally increases with increasing number of columns and/or rows, with the potential drawbacks of increased complexity and cost.

DAC manager 804 is configured to generate columns signals COL, row signals ROW, and a pulse width modulation (PWM) signal to control unit cell array 802. DAC manager 804 is configured to generate a respective COL signal for each column of unit cells, and DAC manager 804 accordingly generates 16 columns signals COL<0:15>. Similarly, DAC manager 804 is configured to generate a respective ROW signal for each row of unit cells, and DAC manager 804 accordingly generates 16 row signals ROW<0:15>. The number of column signals COL and row signals ROW generated by DAC manager 804 will vary with the number of columns of unit cells and rows of unit cells, respectively, of unit cell array 802. DAC manager 804 is discussed further below with respect to FIG. 12.

Figure 9:
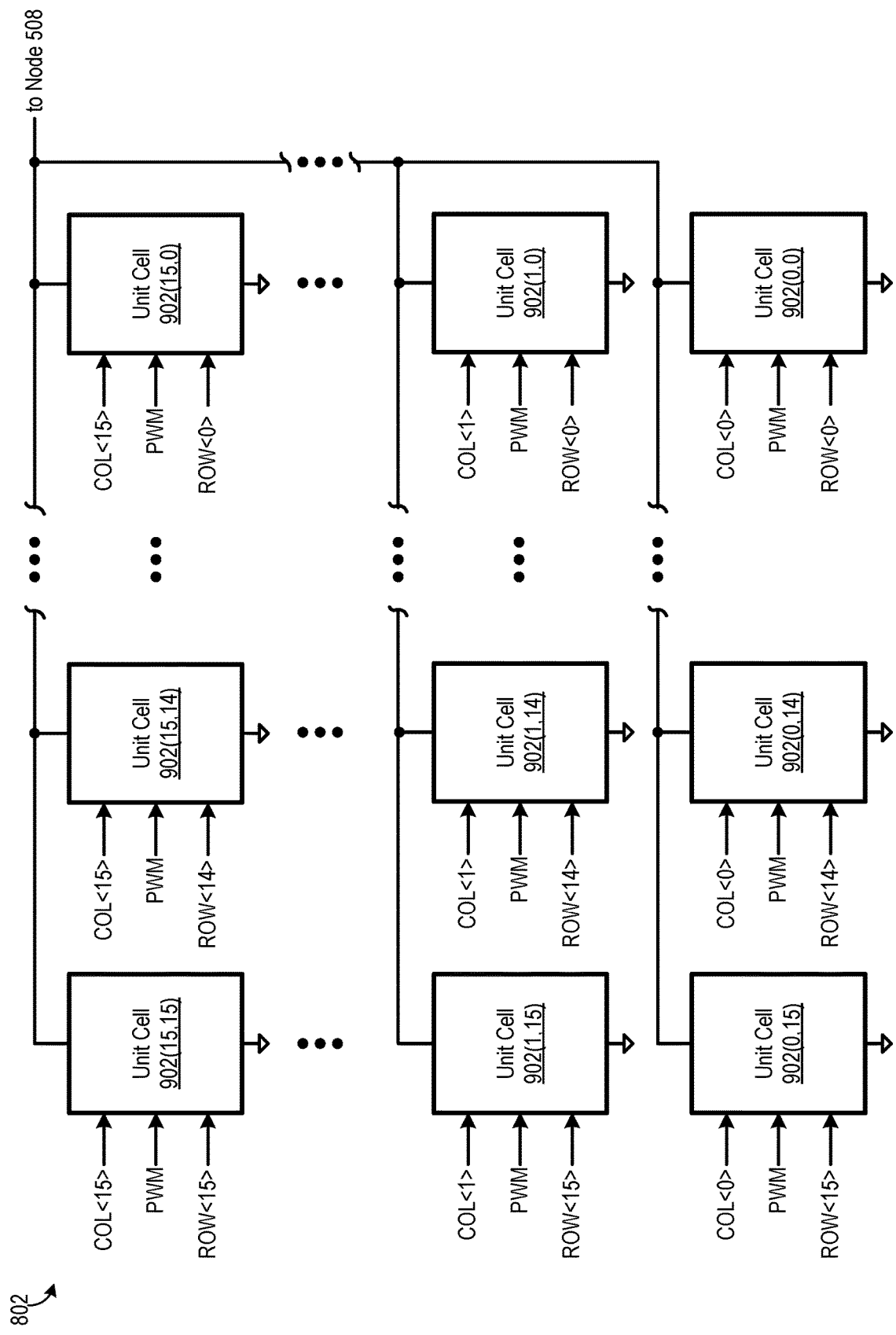
FIG. 9 is a block diagram of a unit cell array of the FIG. 8 Sigma-Delta DAC, according to an embodiment.

FIG. 9 is a block diagram of unit cell array 802, which shows the unit cell array in greater detail than in FIG. 8. Unit cell array 802 includes 16 rows and 16 columns of unit cells 902 forming an array of 256 units cells 902. Each unit cell is labeled in FIG. 9 as 902(X,Y), where X refers to the column number of the unit cell 902 and Y refers to the row number of the unit cell. For example, the unit cell 902 instance at column 1, row 14 is labeled as unit cell 902(1, 14). Each unit cell 902 is electrically coupled between voltage feedback node 508 and ground (or another reference node), and each unit cell 902 receives the following signals as control signals from DAC manager 804: (a) a column signal COL corresponding to the column of the unit cell 902, (b) a row signal ROW corresponding to the row of the unit cell 902, and (c) the PWM signal. For example, unit cell 902(1,14) is located at column 1, row 14, and unit cell 902(1,14) accordingly receives the following control signals from DAC manager 804: (a) column signal COL<1>, (b) row signal ROW<14>, and (c) the PWM signal. In some alternate embodiments, such as discussed below with respect to FIG. 11, one or more unit cells 902 additionally receives (a) the column signal COL for the next column (if applicable) and (b) the ROW signal for the next row (if applicable). For example, unit cell 902(1,14) receives the following control signals from DAC manager 804 in these alternate embodiments: (a) column signal COL<1>, (b) column signal COL<2>, (c) row signal ROW<14>, (d) row signal ROW<15>, and (e) the PWM signal.

Figure 10:
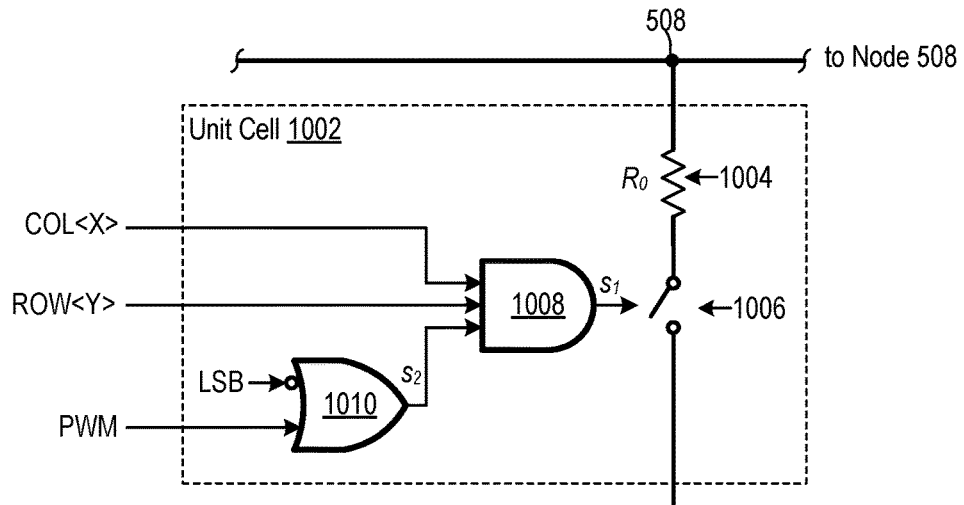
FIG. 10 is a block diagram of one possible embodiment of a unit cell of the FIG. 9 unit cell array.
Figure 11:
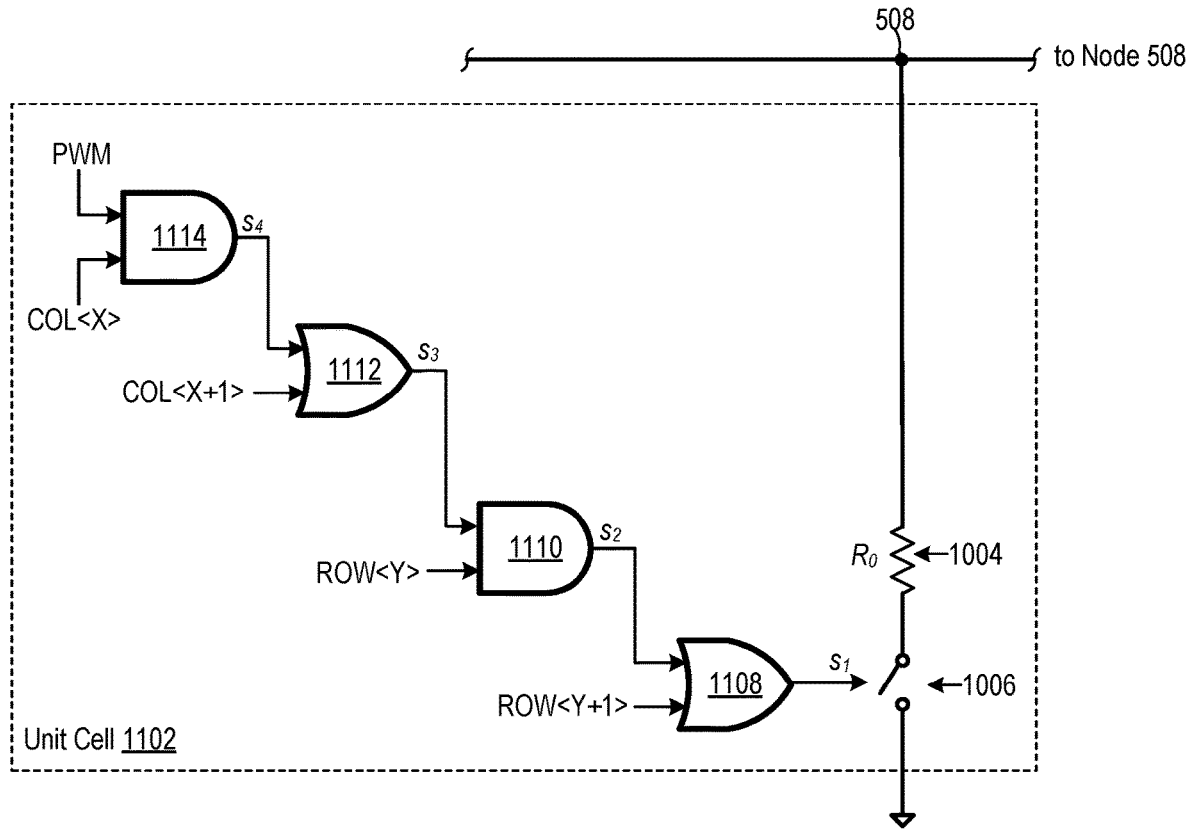
FIG. 11 is a block diagram of another possible embodiment of a unit cell of the FIG. 9 unit cell array.

Each unit cell 902 presents a respective resistance between voltage feedback node 508 and ground (or another reference node), as controlled by DAC manager 804. As such, equivalent resistance $R_{eqv}$ of unit cell array 802 is determined by collective resistance of all unit cells 902, and DAC manager 804 can change equivalent resistance $R_{eqv}$ by changing operating states of one or more unit cells 902. FIGS. 10 and 11, discussed below, collectively illustrate two different possible embodiments of unit cells 902. It is understood, however, that unit cells 902 may be embodied in other manners without departing from the scope hereof.

FIG. 10 is a block diagram of a unit cell 1002, which is one possible embodiment of a unit cell 902 of FIG. 9. Unit cell 1002 includes a resistive device 1004, a switching device 1006, AND logic 1008, and OR logic 1010. Resistive device 1004 and switching device 1006 are electrically coupled in series between voltage feedback node 508 and ground (or another reference node). Switching device 1006 is referenced to ground in the FIG. 10 embodiment, such as for ease controlling the switching device. In some alternate embodiments, however, topological locations of resistive device 1004 and switching device 1006 are swapped such that resistive device 1004, instead of switching device 1006, is referenced to ground.

Switching device 1006 is controlled by a signal $s_1$ generated by AND logic 1008 such that (a) switching device 1006 is closed when signal $s_1$ is asserted and (b) switching device 1006 is open when signal $s_1$ is de-asserted. AND logic 1008 is configured such that signal $s_1$ is asserted if, and only if, each of the following signals is asserted: (a) the column signal COL(X) received by unit cell 1002, (b) the row signal ROW(Y) received by the unit cell 1002, and (c) a signal $s_2$ generated by OR logic 1010, where X and Y correspond to the column and row of unit cell 1002, respectively.

OR logic 1010 receives the PWM signal and a least signal bit (LSB) signal as inputs. The LSB signal is asserted when unit cell 1002 corresponds to a least significant bit of equivalent resistance Reqv, and the LSB signal is otherwise de-asserted. Only one unit cell 1002 instance of unit cell array 802 will correspond to the least significant bit of equivalent resistance $R_{eqv}$ at a given time. In some embodiment, the LSB signal is generated internal to unit cell 1002, while in some other embodiments, unit cell 1002 receives the LSB signal from DAC manager 804 or another external source. OR logic 1010 is configured such that signal $s_2$ is asserted if either of the following conditions is true: (a) the PWM signal is asserted or (b) the LSB signal is de-asserted.

Resistive device 1004 has a resistance $R_0$, which may be referred to as a unit resistance. As such, unit cell 1002 will present a resistance of $R_0$ between voltage feedback node 508 and ground when (a) both of column signal COL<X> and row signal ROW<Y> are asserted and (b) the LSB signal is de-asserted. Additionally, unit cell 1002 will present an infinite resistance between voltage feedback node 508 and ground whenever column signal COL<X> and/or row signal ROW<Y> is de-asserted. Additionally, unit cell 1002 will present a resistance of $R_0$ between voltage feedback node 508 and ground, as modulated by the PWM signal, when (a) both of column signal COL<X> and row signal ROW<Y> are asserted and (b) the LSB signal is asserted.

OR logic 1008 and AND logic 1010 are implemented, for example, by digital and/or analog electronics. In some embodiments, OR logic 1008 and AND logic 1010 are at least partially implemented by a processor (not shown) executing instructions, such as in the form of software or firmware, stored in a data store (not shown). Although OR logic 1008 and AND logic 1010 are depicted as being separate elements, these two elements may be partially or fully combined without departing from the scope hereof Additionally, OR logic 1008 and AND logic 1010 could be replaced with one or more alternative elements for controlling switching device 1006, as long as unit cell 1002 presents the aforementioned resistance between voltage feedback node 508 and ground as a function of column signal COL<X>, row signal ROW<Y>, and the PWM signal.

FIG. 11 is a block diagram of a unit cell 1102, which is another possible embodiment of a unit cell 902 of FIG. 9. Unit cell 1102 includes an instance of resistive device 1004, an instance of switching device 1006, OR logic 1108, AND logic 1110, OR logic 1112, and AND logic 1114. Resistive device 1004 and switching device 1006 are configured in the same manner as discussed above with respect to unit cell 1002 of FIG. 10. Switching device 1006 in FIG. 11 is controlled by a signal $s_1$ generated by OR logic 1108 such that (a) switching device 1006 is closed when signal $s_1$ is asserted and (b) switching device 1006 is open when signal $s_1$ is de-asserted. OR logic 1108 is configured to assert signal $s_1$ whenever either (a) row signal ROW(Y+1) is asserted or (b) a signal $s_2$ from AND logic 1110 is asserted. Row signal ROW<Y+1> is the row signal for the row immediately following the row of unit cell 1102. For example, if unit cell 1102 is located in row 2, Y is equal to 2, and row signal ROW<Y+1> is accordingly row signal ROW<3>. In instances of unit cell 1102 located in the last row, i.e., row 15 of unit cell array 802, OR logic 1108 is omitted, and switching device 1006 is controlled by signal $s_2$ instead of by signal $s_1$.

AND logic 1110 is configured to assert signal $s_2$ if, and only if, each of the following signals is asserted: (a) row signal ROW<Y> and (b) a signal $s_3$ generated by AND logic 1112. Row signal ROW<Y> is the row signal of unit cell 1102. For example, if unit cell 1102 is located in row 2, Y is equal to 2, and row signal ROW<Y> is ROW<2>.

OR logic 1112 is configured to assert signal $s_3$ whenever either (a) column signal COL(X+1) is asserted or (b) a signal $s_4$ from AND logic 1114 is asserted. Column signal COL<X+1> is the column signal for the column immediately following the column of unit cell 1102. For example, if unit cell 1102 is located in column 4, X is equal to 4, and column signal COL<X+1> is accordingly column signal COL<5>. In instances of unit cell 1102 located in the last column, i.e., column 15 of unit cell array 802, OR logic 1112 is omitted, and AND logic receives signal $s_4$ as an input in place of signal $s_3$.

AND logic 1114 is configured to assert signal $s_4$ if, and only if, each of the following signals is asserted: (a) column signal COL<X> and (b) the PWM signal. Column signal COL<X> is the column signal of unit cell 1102. For example, if unit cell 1102 is located in column 4, X is equal to 4, and column signal COL<X> is COL<4>.

OR logic 1108, AND logic 1110, OR logic 1112, and AND logic 1114 are implemented, for example, by digital and/or analog electronics. In some embodiments, OR logic 1108, AND logic 1110, OR logic 1112, and AND logic 1114 are at least partially implemented by a processor (not shown) executing instructions, such as in the form of software or firmware, stored in a data store (not shown). Although OR logic 1108, AND logic 1110, OR logic 1112, and AND logic 1114 are depicted as being separate elements, two or more of these elements may be partially or fully combined without departing from the scope hereof. Additionally, OR logic 1108, AND logic 1110, OR logic 1112, and AND logic 1114 could be replaced with one or more alternative elements for controlling switching device 1006 that perform the same function as the aforementioned logic.

Figure 12:
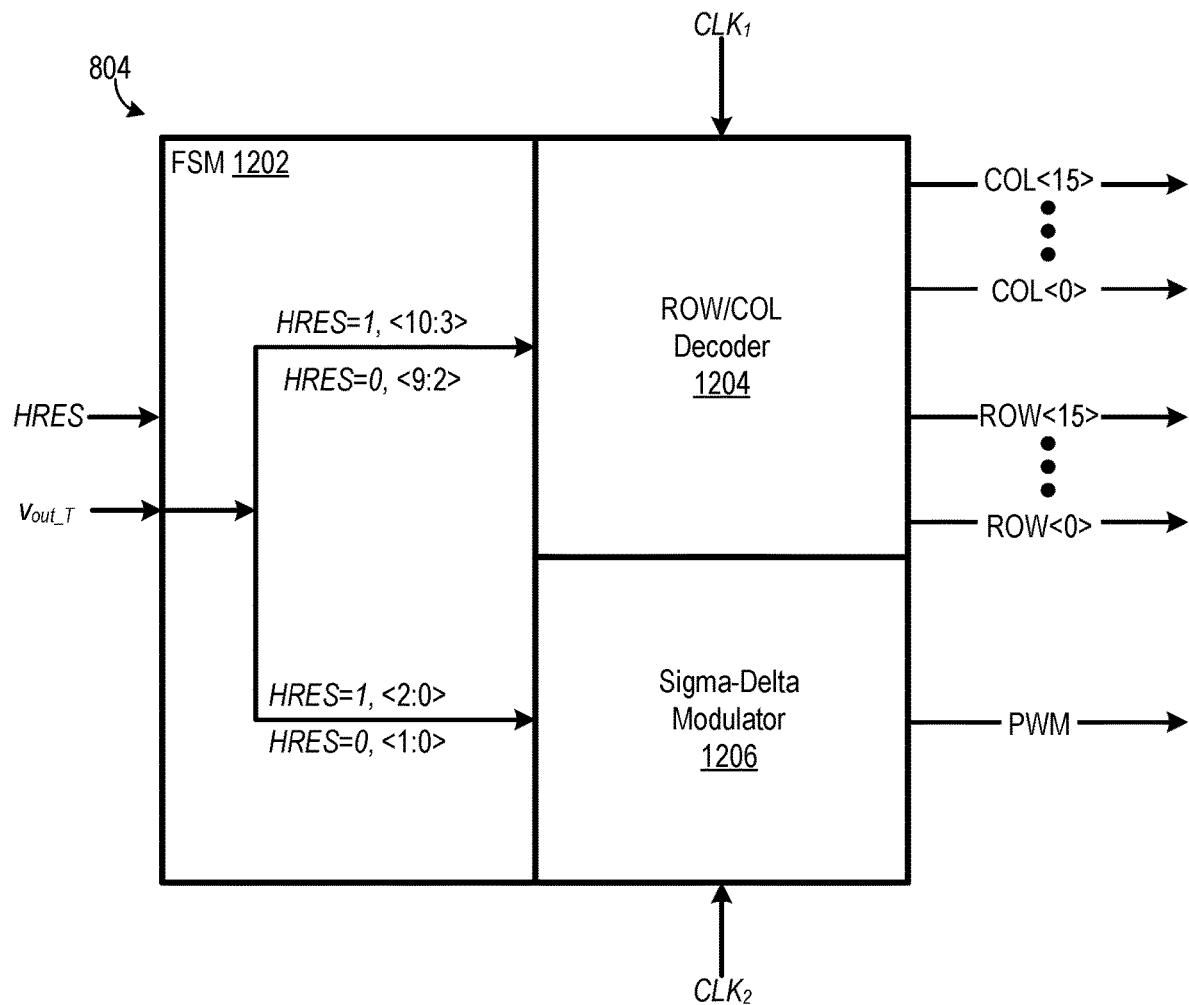
FIG. 12 is a block diagram of a DAC manager of the FIG. 8 Sigma-Delta DAC, according to an embodiment.

FIG. 12 is a block diagram of DAC manager 804, which shows the DAC manager in greater detail than in FIG. 8. DAC manager 804 includes a finite state machine (FSM) 1202, a ROW/COL decoder 1204 (henceforth referred to as "decoder 1204" for brevity), and a Sigma-Delta modulator 1206 (henceforth referred to "modulator 1206" for brevity). Although FSM 1202, decoder 1204, and modulator 1206 are depicted as being separate elements, in some embodiments, two or more of these elements are at least partially combined. The elements of DAC manager 804 are formed, for example, by analog and/or digital electronics. In some embodiments, one or more elements of DAC manager 804 are at least partially implemented by a processor (not shown) executing instructions, such as in the form of software or firmware, stored in a data store (not shown).

DAC 804 is configured to receive a signal $v_{out\_T}$, as well as a signal HRES, to program equivalent resistance $R_{eqv}$ of DAC 800 and thereby control magnitude of output voltage $v_{out}$. Signal $v_{out\_T}$ specifies a desired magnitude of output voltage $v_{out}$. In the FIG. 12 example, signal $v_{out\_T}$ is an eleven bit signal when programmable power supply 100 is operating in a high resolution mode, and signal $v_{out\_T}$ is a ten bit signal when programmable power supply 100 is operating in a standard resolution mode. However, the number of bits of signal $v_{out\_T}$ could vary without departing from the scope hereof Signal HRES indicates whether programmable power supply 100 is operating in the high resolution mode or in the standard resolution mode, where resolution in this context refers to resolution of output voltage $v_{out}$ magnitude. For example, in certain embodiments, output voltage $v_{out}$ magnitude is programmable in 10 millivolt increments in the high resolution mode of programmable power supply 100, and output voltage $v_{out}$ is programmable in 20 millivolt increments in the standard resolution mode of programmable power supply 100. In the FIG. 12 embodiment, programmable power supply 100 operates in the high resolution mode when signal HRES is asserted, and programmable power supply 100 operates in the standard resolution mode when signal HRES is de-asserted.

FSM 1202 is configured to split bits of signal $v_{out\_T}$ between decoder 1204 and modulator 1206 depending on the state of signal HRES. In particular, when signal HRES is de-asserted, FSM splits bits of signal $v_{out\_T}$ as follows: (a) bits <1:0> are directed to modulator 1206 and (b) bits <9:2> are directed to decoder 1204. On the other hand, when signal HRES is asserted, FSM 1202 splits bits of signal $v_{out\_T}$ as follows: (a) bits <2:0> are directed to modulator 1206 and (b) bits <10:3> are directed to decoder 1204. FSM 1202 could be figured to split bits of signal $v_{out\_T}$ in a different manner without departing from the scope hereof.

Decoder 1204 is configured to assert column signals COL and row signals ROW to achieve an equivalent resistance Reqv of unit cell array 802 as specified by the bits of signal $v_{out\_T}$ directed to decoder 1204, i.e., by bits <9:2> of signal $v_{out\_T}$ in the standard resolution mode and by bits <10:3> of signal $v_{out}$ T in the high resolution mode. In some embodiments, decoder 1204 is configured to assert column signals COL and row signals ROW using an thermometer encoding process, where unit cells 902 are activated or deactivated in succession by column and row in response to a change in signal $v_{out\_T}$, where a unit cell 902 is activated if it presents a resistance $R_0$ between voltage feedback node 508 and ground, and a unit cell 902 is deactivated if it presents an infinite resistance between voltage feedback node 508 and ground. In certain embodiments, decoder 1204 is configured to activate unit cells 902 in succession, starting with column 0, row 0, progressing through each column of row 0, and then progressing to successive rows, as required to achieve an equivalent resistance specified by bits <9:2> or bits <10:3> of signal $v_{out\_T}$.

Figure 13:
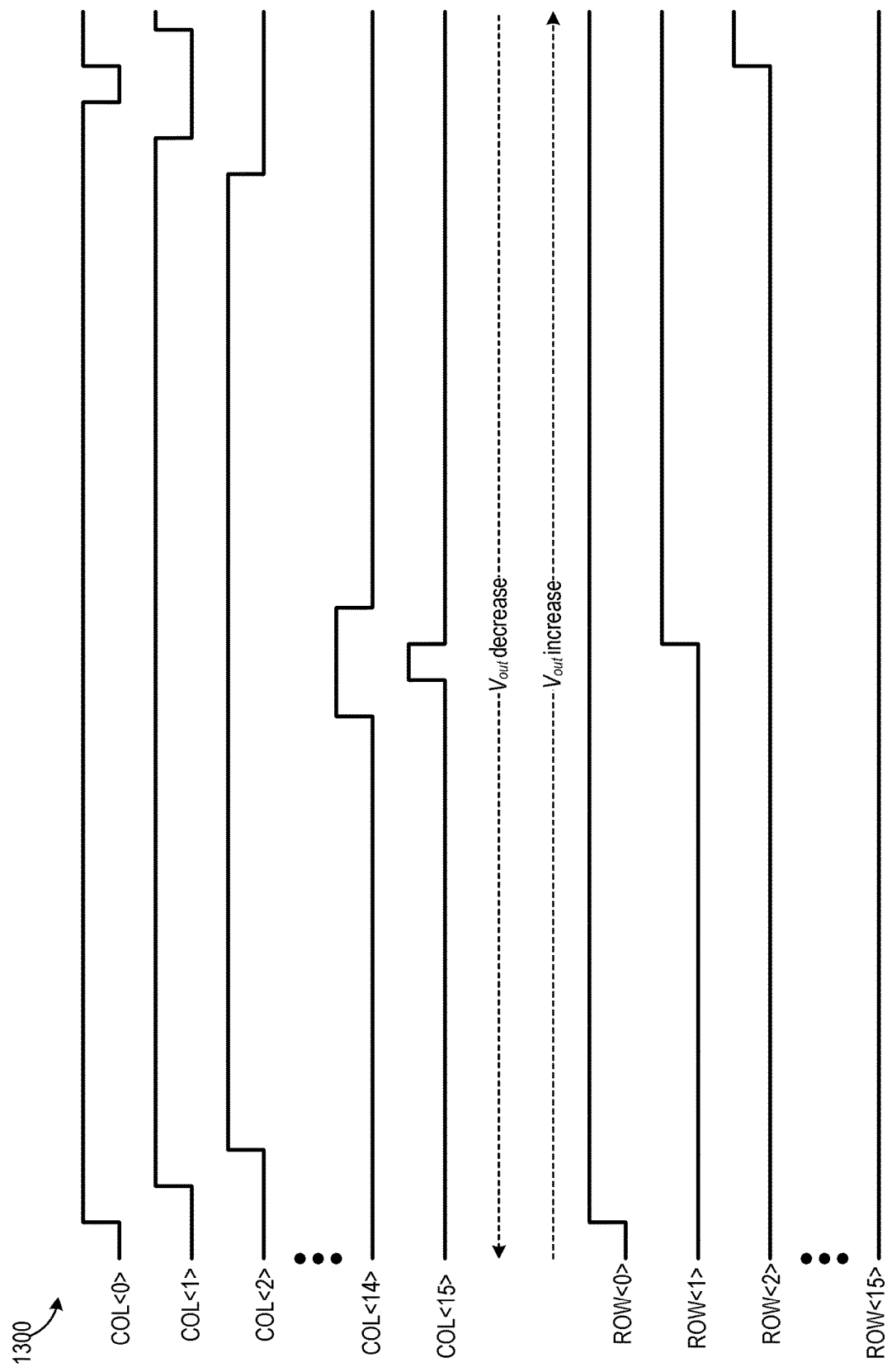
FIG. 13 is a graph illustrating one example of how a decoder of the FIG. 12 DAC manager could generate column signals and row signals, according to an embodiment.

For example, assume that bits <9:2> or bits <10:3> of signal $v_{out\_T}$ specify that $R_{eqv}$ is $R_0/18$, which corresponds to (a) 18 unit cells 902 of unit cell array 802 being activated and (b) 238 unit cells 902 of unit cell array 802 being deactivated. Decoder 1204 would generate column signals COL and row signals ROW such that (a) unit cells 902 of all 16 columns of row 0 are activated, (b) unit cells 902 of columns 0 and 1 of row 1 are activated, and (c) all remaining unit cells 902 are deactivated. In this example, the unit cell 902 at column 1, row 1, would correspond to the least significant bit of equivalent resistance $R_{eqv}$. As another example, assume that bits <9:2> or bits <10:3> of signal $v_{out\_T}$ specify that Reqv is $R_0/35$, which corresponds to (a) 35 unit cells 902 of unit cell array 802 being activated and (b) 221 unit cells 902 of unit cell array 802 being deactivated. Decoder 1204 would generate column signals COL and row signals ROW such that (a) unit cells 902 of all 16 columns of row 0 are activated, (b) unit cells 902 of all 16 columns of row 1 are activated, and (c) unit cells 902 of columns 0, 1, and 2 of row 2 are activated, and (d) all remaining unit cells 902 are deactivated. In this example, the unit cell 902 at column 2, row 2, would correspond to the least significant bit of equivalent resistance $R_{eqv}$. FIG. 13 is a graph 1300 illustrating one example of how decoder 1204 could generate column signals COL and row signals ROW when unit cells are 902 are implemented as illustrated in FIG. 11. Magnitude of output voltage $V_{out}$ increases when moving from left to right along graph 1300, and magnitude of output voltage $V_{out}$ decreases when moving from right to left along graph 1300.

Referring again to FIG. 12, decoder 1204 is additionally configured to update assertion of column signals COL and row signals ROW in response to bits <9:2> or bits <10:3> of signal $v_{out\_T}$ upon each assertion of a clock signal $CLK_1$. Accordingly, the frequency at which decoder 1204 responds to a change in signal $v_{out\_T}$ is equal to a frequency of clock signal $CLK_1$.

Modulator 1206 is a Sigma-Delta modulator configured to operate according to a clock signal to generate the PWM signal such that an average duty cycle of the PWM signal is specified by the bits of signal $v_{out\_T}$ directed to modulator 1206, i.e., by bits <1:0> of signal $v_{out\_T}$ in the standard resolution mode and by bits <2:0> of signal $v_{out\_T}$ in the high resolution mode. Clock signal $CLK_2$ has a significantly higher frequency than clock signal $CLK_1$. As discussed above, one unit cell 902 instance of unit cell array 802 corresponds to the least significant bit of equivalent resistance $R_{eqv}$ at any given time, and the PWM signal generated by modulator 1206 modulates $R_0$ of this particular unit cell 902 according to bits <1:0> or <2:0> of signal $v_{out\_T}$, such that the resistor of this particular unit cell (e.g., resistive device 1004) is repeatedly coupled and decoupled from voltage feedback node 508. As such, resistance presented by this particular unit cell 902 instance may vary between $R_0$ and infinity, as a function of the average duty cycle of the PWM signal, instead of being restricted to either $R_0$ or infinity. Such ability to finely control resistance of the unit cell instance 902 corresponding to the least significant bit of equivalent resistance $R_{eqv}$ enables DAC 800 to achieve high resolution in the programmed value of $R_{eqv}$, which in turn enables high resolution in programmed output voltage magnitude $v_{out}$.

Referring again to FIG. 1, controller 102 is configured such that current control subsystem 110 and voltage controller subsystem 112 are logically coupled in series, instead of logically coupled in parallel. In particular, current control subsystem 110 generates current error signal $i_{err}$, and voltage control subsystem 112 generates voltage error signal $v_{err}$ partially based on current error signal $i_{err}$, such that power stage 104 is controlled by the series combination of current control subsystem 110 and voltage control subsystem 112, during the constant current operating mode of programmable power supply 100. Additionally, current control subsystem 110 and voltage control subsystem 112 are configured to operate simultaneously while the controller controls 102 operation of programmable power supply 100. In particular, voltage control subsystem 112 and current control subsystem 110 simultaneously generate voltage error signal $v_{err}$ and current error signal $i_{err}$, respectively, during operation of controller 102, although current control subsystem 110 is configured to disable flow of current error signal $i_{err}$ to voltage control subsystem 112 during constant voltage operation of programmable power supply 100. Such serial configuration of the two control subsystems of controller 102, as well as their simultaneous operation, advantageously promotes tight regulation of output voltage $v_{out}$ and/or output current $i_{out}$ when programmable power supply 100 transitions between constant voltage and constant current operating modes.

Figure 14:
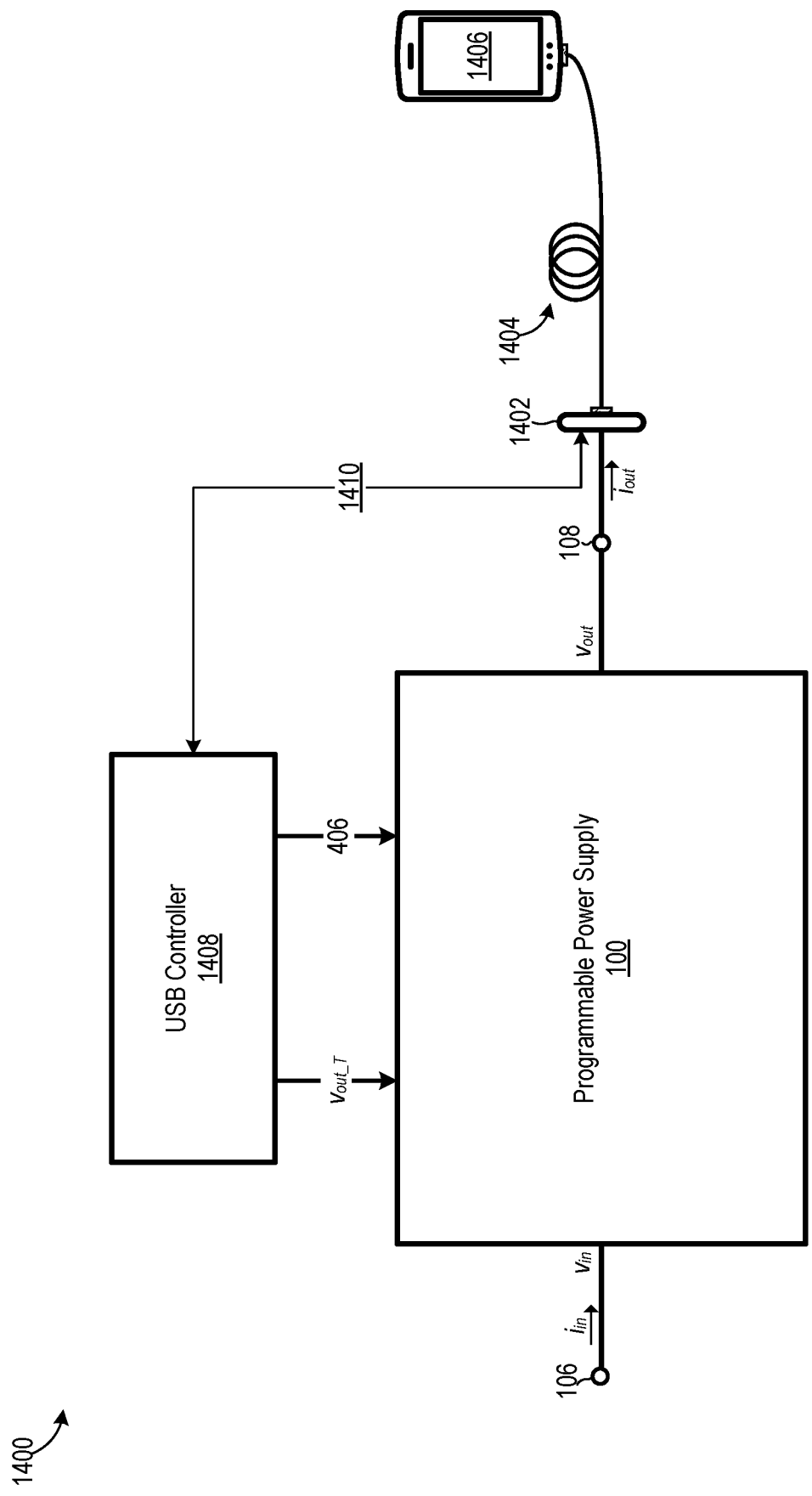
FIG. 14 is a block diagram of a programmable Universal Serial Bus (USB) power system including an embodiment of the FIG. 1 programmable power supply, according to an embodiment.

FIG. 14 is a block diagram of a programmable USB power system 1400, which is one possible application of programmable power supply 100. It is understood, however, that programmable power supply 100 is not limited to this application, and programmable power supply 100 could be used in many other applications to achieve programmable output voltage and/or output current magnitude.

Programmable USB power system 1400 includes an instance of programmable power supply 100, a USB connector or receptacle 1402, a USB cable 1404, a mobile telephone 1406, and a USB controller 1408. Details of programmable power supply 100 are not shown in FIG. 12. In some embodiments, USB connector or receptacle 1402 includes a USB type-C connector. Mobile telephone 1406 acts a load on programmable power supply 100, and mobile phone 1406 is accordingly electrically coupled to output power node 108 via USB connector or receptacle 1402 and USB cable 1404. USB controller 1408 is configured to provide signal $v_{out\_T}$ and reference current value 406 to programmable power supply 100 to program output voltage $v_{out}$ and output current $i_{out}$ magnitude, respectively, such as based on current requirements of mobile telephone 1406 in accordance with a USB power delivery standard. For example, some embodiments of USB controller 1408 are configured to vary signal $v_{out\_T}$ and reference current value 406 according to current state of charge of a battery (not shown) of mobile telephone 1406, during charging of the battery. One or more communication lines 1410 optionally communicatively couple USB controller 1408 to USB connector or receptacle 1402, such that USB controller 1408 may communicate with mobile telephone 1406 via USB cable 1404. Mobile telephone 1406 could be replaced with another type of USB device without departing from the scope hereof.

Combinations of Features

Features described above may be combined in various ways without departing from the scope hereof. The following examples illustrate some possible combinations.

(A1) A method for controlling a power supply includes (1) generating a current error signal representing a difference between (a) magnitude of an output current of the power supply and (b) magnitude of a reference current value, and (2) providing the current error signal for injection into a voltage feedback node of the power supply.

(A2) The method denoted as (A1) may further include disabling flow of the current error signal to the voltage feedback node in response to magnitude of the output current exceeding magnitude of the reference current value.

(A3) The method denoted as (A2) may further include enabling flow of the current error signal to the voltage feedback node in response to magnitude of the output current not exceeding magnitude of the reference current value.

(A4) The method denoted as (A1) may further include disabling flow of the current error signal to the voltage feedback node in response to expiration of a delay time period being triggered by magnitude of the output current exceeding magnitude of the reference current value.

(A5) The method denoted as (A4) may further include enabling flow of the current error signal to the voltage feedback node in response to magnitude of the output current not exceeding magnitude of the reference current value.

(A6) In any one of the methods denoted as (A1) through (A5), the voltage feedback node of the power supply may be a resistor divider node.

(A7) The method denoted as (A6) may further include varying resistance of a resistive device electrically coupled to the resistor divider node, to change a magnitude of an output voltage of the power supply.

(A8) In the method denoted as (A7), the resistive device may include a Sigma-Delta digital to analog converter (DAC).

(A9) The method denoted as (A8) may further include repeatedly coupling and decoupling a unit resistor of the Sigma-Delta DAC of the resistor divider node.

(A10) In any one of the methods denoted as (A1) through (A9), the power supply may be part of a programmable Universal Serial Bus (USB) power system.

(B1) A controller for a power supply includes (1) a current control subsystem configured to regulate a magnitude of an output current of the power supply, and (2) a voltage control subsystem configured to regulate a magnitude of an output voltage of the power supply, the voltage control subsystem being logically coupled in series with the current control subsystem.

(B2) In the controller denoted as (B1), the current control subsystem and the voltage control subsystem may be configured to operate simultaneously while the controller controls operation of the power supply.

(B3) In either one of the controllers denoted as (B1) and (B2), (1) the voltage control subsystem may be further configured to generate a voltage error signal representing a difference between (a) a voltage at a voltage feedback node and (b) a reference voltage value, and (2) the current control subsystem may be further configured to: (i) generate a current error signal representing a difference between (a) the magnitude of the output current of the power supply and (b) magnitude of a reference current value, and (ii) inject the current error signal into the voltage feedback node.

(B4) In the controller denoted as (B3), the current control subsystem may include switching circuitry configured to disable flow of the current error signal to the voltage feedback node at least partially based on a relationship between (a) the magnitude of the output current of the power supply and (b) magnitude of the reference current value.

(B5) In any one of the controllers denoted as (B3) and (B4), the voltage control subsystem may include a Sigma-Delta digital to analog converter (DAC) electrically coupled to the voltage feedback node, and the voltage control subsystem may be configured to change magnitude of the output voltage by changing an equivalent resistance of the Sigma-Delta DAC.

(C1) A programmable power supply includes (1) a voltage control subsystem configured to generate a voltage error signal representing a difference between (a) a voltage at a voltage feedback node and (b) a reference voltage value, (2) a current control subsystem configured to: (i) generate a current error signal representing a difference between (a) magnitude of an output current of the power supply and (b) magnitude of a reference current value, and (ii) inject the current error signal into the voltage feedback node, and (3) a power stage configured to operate according to the voltage error signal.

(C2) In the programmable power supply denoted as (C1), the current control subsystem may include switching circuitry configured to disable flow of the current error signal to the voltage feedback node at least partially based on a relationship between (a) the magnitude of the output current of the power supply and (b) the magnitude of the reference current value.

(C3) In the programmable power supply denoted as (C2), the switching circuitry may be further configured to delay disabling flow the current error signal to the voltage feedback node until expiration of a delay time period.

(C4) In any one of the programmable power supplies denoted as (C1) through (C3), the voltage control subsystem may include a Sigma-Delta digital to analog converter (DAC) electrically coupled to the voltage feedback node, and the voltage control subsystem may be configured to change magnitude of an output voltage of the programmable power supply by changing an equivalent resistance of the Sigma-Delta DAC.

(C5) In any one of the programmable power supplies denoted as (C1) through (C4), the programmable power supply may be part of a programmable Universal Serial Bus (USB) power system.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for controlling a power supply, comprising:
generating a current error signal representing a difference between (a) a magnitude of an output current of the power supply and (b) a magnitude of a reference current value;
providing the current error signal for injection into a voltage feedback node of the power supply; and
disabling flow of the current error signal to the voltage feedback node in response to the magnitude of the output current exceeding the magnitude of the reference current value.

2. The method of claim 1, further comprising enabling flow of the current error signal to the voltage feedback node in response to the magnitude of the output current not exceeding the magnitude of the reference current value.

3. The method of claim 1, further comprising disabling flow of the current error signal to the voltage feedback node in response to expiration of a delay time period being triggered by the magnitude of the output current exceeding the magnitude of the reference current value.

4. The method of claim 3, further comprising enabling flow of the current error signal to the voltage feedback node in response to the magnitude of the output current not exceeding the magnitude of the reference current value.

5. The method of claim 1, wherein the voltage feedback node of the power supply is a resistor divider node.

6. The method of claim 5, further comprising varying resistance of a resistive device electrically coupled to the resistor divider node, to change a magnitude of an output voltage of the power supply.

7. The method of claim 6, wherein the resistive device comprises a Sigma-Delta digital to analog converter (DAC).

8. The method of claim 7, further comprising repeatedly coupling and decoupling a unit resistor of the Sigma-Delta DAC of the resistor divider node.

9. The method of claim 1, wherein the power supply is part of a programmable Universal Serial Bus (USB) power system.

10. A controller for a power supply, comprising:
a current control subsystem configured to regulate a magnitude of an output current of the power supply; and
a voltage control subsystem configured to regulate a magnitude of an output voltage of the power supply, the voltage control subsystem being logically coupled in series with the current control subsystem;
wherein the voltage control subsystem is further configured to generate a voltage error signal representing a difference between (a) a voltage at a voltage feedback node and (b) a reference voltage value; and
the current control subsystem is further configured to:
generate a current error signal representing a difference between (a) the magnitude of the output current of the power supply and (b) a magnitude of a reference current value, and
inject the current error signal into the voltage feedback node;
wherein the controller further comprises switching circuitry that disables flow of the current error signal to the voltage feedback node in response to the magnitude of the output current exceeding the magnitude of the reference current value.

11. The controller of claim 10, wherein the current control subsystem and the voltage control subsystem are configured to operate simultaneously while the controller controls operation of the power supply.

12. The controller of claim 10, wherein:
the voltage control subsystem comprises a Sigma-Delta digital to analog converter (DAC) electrically coupled to the voltage feedback node; and
the voltage control subsystem is configured to change the magnitude of the output voltage by changing an equivalent resistance of the Sigma-Delta DAC.

13. A programmable power supply, comprising:
a voltage control subsystem configured to generate a voltage error signal representing a difference between (a) a voltage at a voltage feedback node and (b) a reference voltage value;
a current control subsystem configured to:
  generate a current error signal representing a difference between (a) a magnitude of an output current of the power supply and (b) the magnitude of a reference current value, and
  inject the current error signal into the voltage feedback node;
a power stage configured to operate according to the voltage error signal; and
switching circuitry that disables flow of the current error signal to the voltage feedback node in response to the magnitude of the output current exceeding the magnitude of the reference current value.

14. The programmable power supply of claim 13, wherein the switching circuitry is further configured to delay disabling flow the current error signal to the voltage feedback node until expiration of a delay time period.

15. The programmable power supply of claim 13, wherein:
  the voltage control subsystem comprises a Sigma-Delta digital to analog converter (DAC) electrically coupled to the voltage feedback node; and
  the voltage control subsystem is configured to change a magnitude of an output voltage of the programmable power supply by changing an equivalent resistance of the Sigma-Delta DAC.

16. The method of claim 13, wherein the programmable power supply is part of a programmable Universal Serial Bus (USB) power system.

* * * * *